(12) United States Patent
Janssen et al.

(10) Patent No.: US 6,287,685 B1
(45) Date of Patent: Sep. 11, 2001

(54) RUBBER ARTICLE CAPABLE OF BONDING TO A PRESSURE-SENSITIVE ADHESIVE AND METHOD OF MAKING

(75) Inventors: Jeffrey R. Janssen, Woodbury; Michael A. Johnson, Stillwater, both of MN (US); Ulrich Kunze, Meertal (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/987,593

(22) Filed: Dec. 9, 1997

(51) Int. Cl.[7] ................. C09J 7/00; C09J 5/00
(52) U.S. Cl. ............. 428/353; 428/354; 428/492; 156/275.7; 156/306.6; 156/320; 156/322; 156/331.8
(58) Field of Search .................. 428/41.5, 343, 428/353, 354, 355 AC, 492; 156/275.7, 306.6, 320, 322, 331.8

(56) References Cited

U.S. PATENT DOCUMENTS

| | | | |
|---|---|---|---|
| Re. 24,406 | 12/1957 | Weir | 284/17 |
| 4,181,752 | 1/1980 | Martens et al. | 427/54.1 |
| 4,303,485 | 12/1981 | Levins | 204/159.24 |
| 4,329,384 | 5/1982 | Vesley et al. | 428/40 |
| 4,330,590 | 5/1982 | Vesley | 428/336 |
| 4,415,615 | 11/1983 | Esmay | 428/40 |
| 4,563,388 | 1/1986 | Bonk et al. | 428/304 |
| 4,569,879 | * 2/1986 | Groves | 428/354 X |
| 4,710,536 | 12/1987 | Klingen et al. | 524/493 |
| 4,844,979 | * 7/1989 | Strobel et al. | 428/353 X |

FOREIGN PATENT DOCUMENTS

| | | | |
|---|---|---|---|
| 1 594 308 A | 8/1969 | (DE) . | |
| 27 37 828 A | 3/1979 | (DE) . | |
| 0 257 984 | 2/1987 | (EP) | C09J/7/02 |
| 0 384 598 | 2/1990 | (EP) | C09J/7/00 |
| 2 107 335 A | 5/1972 | (FR) . | |
| 1 102 244 A | 2/1968 | (GB) . | |
| 07 100 901 | 4/1995 | (JP) | B29C/47/14 |
| WO 95/13184 | 11/1994 | (WO) | B32B/5/18 |

OTHER PUBLICATIONS

Copy of International Search Report for PCT/US98/08045.
A. Franck et al., *Kunststoff–Kompendium*, Würzburg, 1990, S.124–132, 282–289 and 304–307.
I. Kirk, et al., *Encyclopedia of Chemical Technology*, New York, 1982, vol. 20, pp. 365–468.
"Solvents", *Paint Testing Manual*, 13th ed. (1972), G.G. Seward, ed., American Society for Testing and Materials, Philadelphia, PA.
*Encyclopedia of Polymer Science and Engineering*, 2nd ed., New York, 1988, vol. 4, pp. 355–357.
*Handbook of Pressure Sensitive Technology*, ed. By D. Satas, New York, 1989, pp. 396–456.
"A Three–Dimensional Approach to Solubility", *Journal of Paint Technology*, vol. 38, No. 496, pp. 269–280.

* cited by examiner

*Primary Examiner*—Daniel Zirker
(74) *Attorney, Agent, or Firm*—Brian E. Szymanski; Harold C. Knecht, III

(57) ABSTRACT

The invention provides a process for bonding a pressure-sensitive adhesive to a rubber article. The process includes the steps of heat laminating a heat-activatable adhesive bearing a primer layer to the rubber article at a temperature of at least 100° C. and bonding the pressure-sensitive adhesive to the primer layer. The invention also provides an assembly comprised of a shaped rubber article heat laminated to an adhesive bearing a primer. The invention also provides article of manufacture for bonding a rubber article to a surface.

10 Claims, 2 Drawing Sheets

RUBBER ARTICLE CAPABLE OF BONDING TO A PRESSURE-SENSITIVE ADHESIVE AND METHOD OF MAKING

FIELD OF THE INVENTION

The invention relates to a process for providing a substrate comprising a shaped rubber article whereby the outward surface of the substrate is receptive to the application of a pressure-sensitive adhesive layer. The invention furthermore relates to the substrate which is obtainable by this process.

BACKGROUND OF THE INVENTION

Shaped rubber articles comprising, for example, ethylene-propylene copolymers, ethylene-propylene-diene terpolymers or styrene-butadiene copolymers are frequently used for the preparation of gaskets and automotive weatherstrip seals. The elastomers are typically attached to the respective surface like, for example, an automobile frame by means of a pressure-sensitive adhesive film which provides easy handling and performance advantages such as excellent sealing and low weight compared to other systems like liquid adhesives or mechanical attachment.

Rubbers are low surface energy materials having various degrees of elasticity which do not bond effectively to adhesives in general and, in particular, to pressure-sensitive adhesives. Different methods have been proposed so far to provide a durable bond between rubber materials and the pressure-sensitive adhesive.

EP 0 384 598 describes a dual-functional adhesive tape comprising a polyolefin heat-activatable adhesive layer having a graft-polymerized monomer coating, a pressure-sensitive adhesive layer, and a release liner. The heat-activatable adhesive layer comprising the heat-activatable layer, the primer layer, the pressure-sensitive adhesive layer, and the release liner is heat-laminated to a shaped rubber article by using specifically designed equipment. Then the liner is removed from the pressure-sensitive adhesive layer and the resulting composite structure is pressure-bonded to the respective surface.

JP 07 100 901 discloses a double-sided tape comprising a hot-melt adhesive layer, followed by a relatively thick layer of an acrylic foam, a pressure-sensitive adhesive layer and a liner. The double-sided tape is heat-laminated to a vulcanized rubber substrate such as EPDM (ethylene-propylene-diene terpolymer) directly after vulcanization extrusion while the rubber is still hot. WO 95/13184 describes a similar double-sided tape which is heat-laminated, for example, onto an EPDM profile.

The processes described in EP 0 384 598, JP 07 100 901, and WO 95/13184 do not fulfill all practical requirements to a desirable extent because they do not independently allow independent selection of the adhesive layer.

The temperature window for heat-laminating the double-sided tape to the shaped rubber article is rather narrow because a lamination temperature of at least 100° C. is required on the one hand to provide an acceptable bonding to the rubber article, while on the other hand, the temperature for the heat-lamination step must not be chosen too high in order to avoid an irreversible deformation and/or decomposition, in particular, of the release liner. The narrow temperature range accessible is disadvantageous from a processing point of view. This is especially true if the tape is laminated to the rubber article, and then the rubber article is heated to cure or vulcanize the rubber.

Furthermore, shrinkage of the polyolefin-based elastomer and/or the hot-melt adhesive is often observed on cooling which can cause the pressure-sensitive adhesive layer to wrinkle which results in poor adhesion between the pressure-sensitive adhesive layer and the surface it is applied to.

Therefore, one object of the present invention is to provide a process to render substrates comprising a shaped rubber article, receptive to the application of a pressure-sensitive adhesive layer. Other objects of the present invention can be taken from the following detailed description of the invention.

SUMMARY OF THE INVENTION

The present invention provides a process for bonding a pressure-sensitive adhesive to a shaped rubber article comprising the steps of providing a shaped elastomeric or rubber article; providing a heat-activatable adhesive layer bearing a primer layer; providing a pressure-sensitive adhesive layer; heat-laminating the heat-activatable adhesive to the rubber article at a temperature of at least about 100° C. and with sufficient pressure to effect a bond between the heat-activatable adhesive and the rubber article; and laminating the pressure-sensitive adhesive layer to the primer layer.

The present invention also provides an assembly consisting essentially of a shaped rubber article and a heat-activatable adhesive layer which is heat-laminated thereon, the outward surface of said heat-activatable adhesive layer bearing a primer.

The present invention also provides an article of manufacture for bonding a rubber article to a surface, said article of manufacture comprising a first adhesive component comprising a heat-activatable adhesive layer bearing a primer layer; and a second adhesive component comprising a pressure-sensitive adhesive layer having opposite major surfaces with a releasable liner on one major surface wherein said first adhesive film is kept separate from said second adhesive film until said first adhesive film is heat-laminated to the rubber article.

In another embodiment, the invention provides an article of manufacture for bonding a rubber article to a surface, said article of manufacture comprising a heat-laminated article comprising a rubber article and a heat-activatable adhesive layer bearing a primer layer, with said heat-activatable adhesive layer being heat-laminated to said rubber article; and a pressure-sensitive adhesive layer having opposite major surfaces with a releasable liner on one major surface, wherein said pressure-sensitive adhesive layer is kept separate from said heat-laminated article until said rubber article is to be bonded to the surface.

The present invention also includes the use of the articles of manufacture of the invention for bonding the rubber articles to surfaces.

Composite rubber profiles comprising a substrate according to the invention and a pressure-sensitive adhesive layer which is bonded to the primer layer of the substrate, can preferably be used to bond to parts of automobiles, refrigerators, and door frames by adhering the pressure-sensitive adhesive layer to the part, after the pressure-sensitive adhesive is laminated to the primer layer.

DETAILED DESCRIPTION OF THE INVENTION

Figure 1:
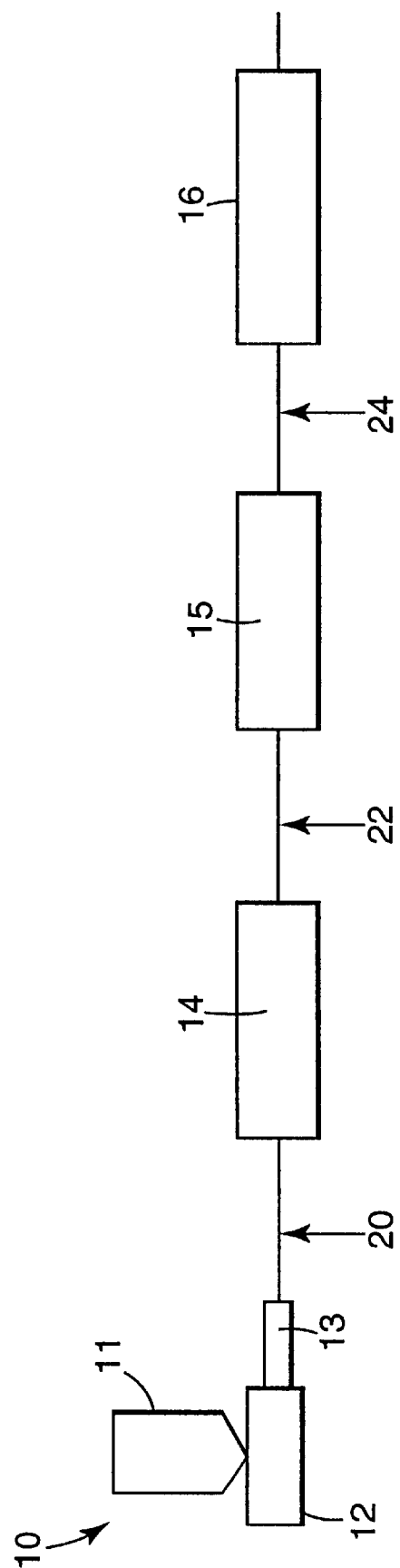
FIG. 1 schematically shows an apparatus and a process for preparing the substrates according to the invention.

The present invention provides a new method for preparing a substrate wherein a shaped rubber article is heat-laminated at a temperature of at least about 100° C. with a heat-activatable layer, the outward surface of which bearing a primer layer as to provide a surface which is receptive to the application of a pressure-sensitive adhesive layer or a coating layer. The method of the invention allows greater flexibility as to when the heat-activatable adhesive is applied to the rubber article, e.g., the heat-activatable adhesive can be applied just after the rubber article is extruded and before vulcanization of the rubber, it can be applied after extruding and after vulcanization of the rubber, or it can be placed into a mold and the rubber article is molded onto the unprimed surface of the heat-activated adhesive. In some processes, such as in injection molding of a rubber article on the heat-activated adhesive, it would be difficult, if not impossible, to mold the article with a pressure-sensitive adhesive layer attached to the heat-activatable adhesive without distorting the adhesive layers, and subsequently the shaped rubber article.

The shaped rubber article comprises one or more synthetic or natural rubbers which are preferably selected to comply with the specific requirements of the respective application. Shaped rubber articles to be used according to the present invention preferably include one or more polymers which are selected from a group comprising ethylene-propylene copolymers, ethylene-propylene-diene terpolymers, polybutadienes, polyisoprenes, polychloroprenes, styrene-butadiene copolymers, acrylonitrile-butadiene copolymers, chlorinated polyethylenes, polychloroprenes, isoprene-isobutylene copolymers, and vinylidene fluoride copolymers.

Ethylene-propylene-diene terpolymers, chlorinated polyethylenes, polychloroprene, and acrylonitrile-butadiene copolymers are especially preferred for the preparation of automotive weatherstrip seals and gaskets.

The rubbers enumerated above are explanatory only and by no means limiting. The person skilled in the art can select other rubbers described in the literature to optimize the shaped rubber article and the substrate according to the present invention with respect to the specific application (see, for example, A.

Franck et al., Kunststoff-Kompendium, Wurzburg, 1990, S. 124–132, 289–282, and 304–307).

The shaped rubber article can further comprise other components such as, for example, vulcanization agents, accelerators, retardants, bonding agents, antioxidants, and stabilizers. The person skilled in the art can select these additives from the pool of additives and auxiliary agents described in prior art (see, for example, I. Kirk et al., Encyclopedia of Chemical Technology, New York, 1982, Vol. 20, pp. 365–468).

The term shaped rubber article as used above and below, refers to rubber articles comprising one or more natural or synthetic rubbers and, optionally, further components which have been formed into the desired shape by means of transfer or injection molding or extrusion, for example. Shaping by means of extrusion is preferred.

The shaping step is performed at an elevated temperature of typically between about 100° C. to about 150° C.

The shaped rubber article is then vulcanized or cross-linked, typically by subjecting the shaped article to electrical oven curing or microwave curing, for example. The curing temperature is typically between about 150° C. to about 280° C., and the curing time is typically between a few seconds to several hours.

The shaping and vulcanization stages may be separated spatially as in the extrusion process or performed at one spot as in transfer or injection molding, for example. The curing process may comprise temperature programming, or in the case of the extrusion process, different curing stations held, for example, at different temperatures.

The shaped rubber article is subsequently heat-laminated at a temperature of at least 100° C. with a heat-activatable adhesive layer, the outward surface of which bears a primer layer, with sufficient pressure to effect a bond between the heat-activatable adhesive and the rubber article. The heat-lamination is preferably performed at a temperature of at least 125° C., more preferably of at least 140° C., and especially preferably between about 150° C. and about 175° C.

The heat-activatable adhesive materials useful for the preparation of the heat-activatable adhesive layer of the present invention, preferably comprise essentially non-polar and/or partially polar heat-activatable adhesive materials.

Essentially non-polar heat-activatable adhesive materials preferably include polyolefin homopolymers or copolymers of essentially non-polar comonomers. Examples of preferred polyolefin homopolymers include, for example, polyethylene, polypropylene, polyisobutylene, or polybutadiene. Examples of essentially non-polar copolymers include, for example, ethylene-propylene copolymers (EPM), ethylene-propylene-diene terpolymers (EPDM), or styrene-butadiene copolymers having various ratios. Preferred examples of essentially non-polar copolymers furthermore are thermoplastic olefin (TPO) elastomers which often are blends of EPM and/or EPDM with polypropylene or polyethylene.

Partially polar heat-activatable adhesive materials are preferably based on polyolefin homopolymers or copolymers of essentially non-polar comonomers additionally comprising one or more polar comonomers. The term polar comonomers includes both moderately polar and strongly polar comonomers with strongly polar comonomers being preferred. Polarity (that is, hydrogen-bonding ability) is frequently described by the use of terms such as 'strongly', 'moderately', and 'poorly'. References describing these and other solubility terms include 'Solvents', Paint Testing Manual, 3rd ed., G. G. Seward, ed., American Society for Testing and Materials, Philadelphia, PA, and 'A Three-Dimensional Approach to Solubility', Journal of Paint Technology, vol. 38, no. 496, pp. 269–280. Polar comonomers useful in the present invention, preferably exhibit at least one carboxylic acid and/or carboxylate group and, in particular, at least one (meth)acrylic acid and/or (meth)acrylate group, and/or at least one halogen atom. Especially preferred polar comonomers are acrylic acid, methacrylic acid, and esters thereof. Preferred examples of partially polar heat-activatable adhesives include ethylene-acrylic acid, propylene acrylic-acid, and isobutylene-acrylic acid copolymers having various ratios, blends of polyethylene and ethylene vinyl acetate and halogenated polyolefins.

It is to be understood that the above enumeration of essentially non-polar and partially polar heat-activatable adhesive materials is explanatory only and by no means limiting. The person skilled in the art can easily select other heat-activatable adhesives to meet, for example, specific requirements with respect to mechanical stability or resistivity against chemicals.

The thickness of the heat-activatable adhesive layer preferably is at least 25 micrometers, more preferably at least 50 micrometers and specifically between 25–150 micrometers. The heat-activatable adhesive layer may be in the form of a film having one or more layers of heat-activatable materials.

Useful heat-activatable adhesives include Primacor™3330, available from Dow Chemical; Polybond™ 1001, available from BP Performance Polymers; and dynamically vulcanized polyolefins available from Monsanto Chemical Company under the name Santoprene™, for example, Santoprene™20-73. Preferred heat-activatable adhesives are SantopreneTM polyolefins, especially those having a Shore D hardness of 50 or less, and a Shore A hardness of 55 or more. In a preferred embodiment, the heat-activatable adhesive is an ethylene propylene copolymer also referred to as a polyallomer. Polyallomers are available commercially from various sources such as Eastman Chemicals and Scholler Technical Papers.

The heat-activatable adhesive materials used in the present invention may contain additional components such as pigments, crosslinking agents, viscosity agents, dispersants, and extrusion aids.

The outward surface of the heat-activatable adhesive layer which is not heat-laminated to the shaped rubber article, is treated with a primer component.

The thickness of the cured primer layer is typically less than 15 $\mu$m, preferably less than 10 $\mu$m, and more preferably not more than 5 $\mu$m.

Essentially non-polar heat-activatable adhesive layers are preferably surface-modified by graft-polymerized monomer coating as is described in some detail in EP 0 384 598, incorporated herein by reference. In this case, the uncured primer composition preferably comprises one or more monomers selected from the group including acrylic acid, methacrylic acid and esters thereof, acrylamide, methacrylamide, sterically non-hindered tertiary alkyl acrylamides and methacrylamides, secondary alkyl acrylamides and methacrylamides having three or less carbon atoms in the alkyl group and N-vinyl pyrrolidone. Examples of useful esters of acrylic acid and methacrylic acid include hydroxyethyl methacrylate, isobutyl methacrylate, hexanediol diacrylate, n-hexyl methacrylate, β-carboxyethyl acrylate, thiodiethylene glycol diacrylate, glycidyl methacrylate, 2,3-dibromopropyl acrylate and diethylaminoethyl acrylate. Examples of useful sterically non-hindered tertiary alkyl acrylamides and methacrylamides include N,N dimethyl acrylamide, N,N-diethyl acrylamide, N,N-dipropyl acrylamide, N-ethyl-N-butyl acrylamide, N,N-dimethyl methacrylamide, N,N-diethyl methacrylamide, and N,N-dipropyl methacrylamide. The preferred sterically non-hindered tertiary alkyl acrylamides include N,N-dimethyl acrylamide, N,N-diethyl acrylamide, and N,N-dipropyl acrylamide. Useful secondary acrylamides include N-methyl acrylamide, N-ethyl acrylamide, and N-n-propyl acrylamide.

The primer composition suitable for graft-polymerization may comprise, additional compounds in order to enhance, for example, wet out properties of the primer composition or internal strength of the cured primer layer. Useful additives to the primer composition are, for example, one or more crosslinking agents which are preferably selected from a group comprising polyethylene glycol diacrylate, pentaerythritol tetraacrylate, tetraethylene glycol dimethacrylate, trimethylol propane triacrylate, trimethylol propane trimethacrylate, allyl methacrylate, 1,6-hexanediol diacrylate, thiodiethylene glycol diacrylate and triallyl cyanurate. Especially preferred crosslinking agents include polyethylene glycol diacrylate, tetraethylene glycol dimethacrylate, trimethylol propane triacrylate and 1,6-hexanedioldiacrylate.

The primer composition suitable for graft-polymerization may also comprise various other additives such as, for example, wetting agents. The amount of the additives with respect to the mass of the uncured primer composition preferably does not exceed 20% and is more preferably less than 10%.

The uncured primer composition is graft-polymerized onto the heat-activatable adhesive by use of ionizing radiation such as electron beam radiation, beta rays, gamma rays, x-rays, Electron beam irradiation is preferred. Electron-beam dosage is typically greater than 0.05 Mrads, preferably from 0.5 Mrads to 5 Mrads.

Essentially non-polar heat-activatable adhesives such as, for example, TPO can furthermore preferably be primed with halogenated polyolefin homopolymers or halogenated copolymers of essentially non-polar comonomers. The primer composition comprises one or more and preferably one or two halogenated polyolefin homopolymers and/or halogenated copolymers of essentially non-polar comonomers which are preferably dissolved or dispersed in an organic solvent such as, for example, toluene, isopropanol, or mixtures of these. The solution or dispersion is then coated onto the heat-activatable adhesive layer with subsequent evaporation of the solvent and drying.

Alternatively, the primer can be extrusion coated or co-extruded with the heat-activated adhesive using commercially available extrusion equipment.

Partially polar heat-activatable adhesives are preferably surface-modified by treating with primer compositions comprising one or more compounds with a cyclic or acyclic, basic nitrogen containing group such as, for example, amino groups, amido groups, nitril groups or azo groups. Preferred examples of compounds comprising cyclic, basic nitrogen containing groups are N-vinyl lactams such as N-vinyl pyrrolidone or N-vinyl caprolactam.

The primer composition which comprises one or more and preferably one to three compounds with a cyclic or acyclic, basic nitrogen containing group, is preferably dissolved or dispersed in organic solvents such as, for example, toluene, isopropanol, or mixtures thereof. The solution or dispersion is then coated onto the heat-activatable adhesive layer with subsequent evaporation of the solvent and drying.

The primer compositions described above render the surface of the heat-activatable adhesive layer receptive to the application of a pressure-sensitive adhesive layer or to coating such as paint, a flocking adhesive to produce a flocked substrate, a protective coating, and the like.

The primer composition is preferably selected so that the T-peel adhesion between the primer layer of the substrate and an acrylic pressure-sensitive adhesive test tape comprising a release liner commercially available as 5367 Acrylic Foam Tape available from Minnesota Mining and Manufacturing Company is preferably at least 5 N/cm, more preferably at least 8 N/cm, and especially preferably not less than 10 N/cm when measured according to DIN 51221. The test tape employs an aluminum backing with a thickness of 127 $\mu$m. The thickness of the pressure-sensitive adhesive layer of the test tape is 1,100 $\mu$m.

The primer composition and the priming conditions described above are explanatory only, however, and the person skilled in the art can easily select further primer compositions from the pool of materials described in the state of the art.

The decisive improvement of the process according to the present invention resides in the fact that the surface-modified, primed heat-activatable adhesive layer is heat-laminated to the shaped rubber article prior to adhering the pressure-sensitive layer to the primer layer. The pressure-sensitive adhesive layer which is protected by a liner, is attached subsequently. The sequence of steps disclosed in the present invention results in several important advantages:

In the present invention, the primer layer of the heat-activatable adhesive layer does not need to be protected by a release liner because the primer layer is not tacky. This allows one to apply higher temperatures during the heat-lamination step compared to known processes because heat deformation and/or decomposition of the release liner does not occur. Performing the heat-lamination step at higher temperatures results in a reliable and strong bonding between the shaped rubber article and the heat-activatable adhesive layer. Additionally, the primer layers of the invention are unaffected by other substituents that are typically used in rubber.

Furthermore, in the process according to the present invention, the heat of the extruded shaped rubber article is very effectively transferred to the heat-activatable layer which bears only a very thin primer layer so that dissipation of heat is effectively suppressed. This concentration of the heat in the bonding zone ensures a good bonding between the shaped rubber article and the heat-activatable layer. Dissipation of heat is less effectively suppressed in the multilayer constructions of EP 0 384 598, JP 07 100 901, or WO 95/13184.

Possible shrinkage of the shaped rubber article during heat-lamination and subsequent cooling can be compensated by applying appropriate tension to the heat-activatable adhesive layer so that a flat primed surface results after heat-lamination and cooling. This usually is not possible or at least very difficult for the multilayer constructions of EP 0 3 84 598, JP 07 100 901, or WO 95/13184.

Mechanical part-forming operations such as die-cutting are difficult in case of the multilayer constructions of EP 0 384 598, JP 07 100 901, or WO 95/13184 because of possible liner pop-offs. This is not a problem in the present invention.

The substrates according to the present invention comprising the shaped rubber article, the heat-activatable adhesive layer, and the primer layer can be subjected to part-forming operations which require elevated temperatures. It is, for example, possible to mold additional rubber parts to the ends of a cut part of the substrate to make it compatible with a specific geometry of a car body, for example. The additional rubber parts can be primed by putting a primed heat-activatable adhesive layer into the molding and injecting the rubber against the side opposite to the primer. It may also be possible to affix the additional parts with mechanical fastener systems; in this case, the molded additional parts comprise one part of the mechanical fastener system. The substrate can also be shaped by heating it to a viscous liquid state with subsequent shaping and cooling. It is also possible to heat-bond further sections of a substrate according to the invention to a cut part of the substrate. Heat-shaping or heat-bonding would be very difficult with the multilayer constructions of EP 0 384 598, JP 07 100 901, and WO 95/13184 because of the presence of the heat-sensitive pressure-sensitive adhesive layer and the liner.

It should be noted that from a practical point of view it would be at least highly disadvantageous to apply the primer layer directly onto the shaped rubber article. The primer composition typically comprises an organic solvent or a mixture of organic solvents or is a solution of monomers to be graft-polymerized. Therefore, the priming step has to be performed in a way to ensure that volatile organic gases do not come into contact with operating personnel and are kept from escaping into the atmosphere. Manufacturing lines of shaped rubber articles usually do not comprise closed manufacturing compartments suitable for handling of volatile organic compounds. Moreover, primer compositions can be applied to broad runs of heat-activatable pressure-sensitive adhesive films which are subsequently cut into smaller tapes as required. This is not possible during manufacturing of shaped rubber articles. Sealants or weather-strips for automotive applications, for example, exhibit a complicated structure, and they usually have to be extruded as single or double profiles but one-step manufacturing of multiple profiles with subsequent separation typically is not possible.

The heat-lamination step can be performed, for example, by contacting the heat-activatable adhesive layer and the fully vulcanized shaped rubber article at room temperature whereby the contact zone is heat-activated. This process requires, however, a specifically designed heating equipment and allows only relatively low lamination speeds. Therefore, this process is often less preferred.

In another method, the heat-activatable adhesive layer is applied to the shaped rubber article while this is still being vulcanized and therefore held at elevated temperatures. This process, which is preferred, may be characterized as an in-line lamination process.

FIG. 1 schematically shows an in-line lamination process 10 using an extruder for the preparation of the substrate of the present invention. The uncured rubber is fed into an extruder 12 via the hopper 11. The rubber is shaped by being pressed through the die 13, and the shaped rubber article 9 obtained is transported via two curing stations (for example, microwave curing station 14 and oven curing station 15 (thermal energy)) to the cooling station 16 which may use, for example, air or water cooling. The heat-activatable adhesive can be applied at any point after extrusion and before cooling, for example, points 20, 22, or 24, provided that the shaped rubber article still exhibits an elevated temperature due to the preceding processing step, that is, for example extrusion, microwave curing, oven curing, or other curing means including glass bead and salt bath curing stations known in the art.

Prior to the application of the heat-activatable adhesive layer, the shaped rubber article preferably is at least partly vulcanized or crosslinked. The degree of cross-link as measured via swelling measurements or via stress strain curves (see Encyclopedia of Polymer Science and Engineering, 2nd ed., New York, 1988, Vol. 4, pp. 355–357) is preferably at least 5%, more preferably at least 20%, and especially preferable at least 25% with a cross-link degree of 100% denoting the fully vulcanized shaped rubber article. In the schematic representation of the process shown in FIG. 1, the rubber material is already partially cross-linked in the extruder. The crosslinking reaction continues when the shaped rubber article is moved through the curing stations 14 and 15 with the degree of crosslinking increasing from position 20 to position 24 (FIG. 1).

The process of FIG. 1 which gives an example for an in-line lamination process, is only explanatory and by no means limiting. The person skilled in the art can easily modify the extrusion process to optimize the properties of the resulting substrate according to the present invention.

The temperature in the extruder 12 is preferably between 40° C. and 120° C., and more preferably between 50° C. and 100° C., inclusive. The die temperature preferably is between 50° C. and 150° C., and more preferably between 60° C. and 130° C., inclusive. The extrusion speed is preferably between 2 to 30 m/min, and more preferably at least 5 m/min.

The temperature of the curing station stations can vary over a wide range of typically from 150° C. to 280° C., and more preferably from 170° C. to 260° C. The temperature in the curing stations can be kept constant or can be varied, for example, linearly or stepwise or according to other temperature programs. The number of curing stations can vary and is preferably from 1 to 5, and more preferably from 1 to 3. The time for which the cured rubber article sees the curing stations, depends on the extrusion speed and on the length of the curing stations and is typically from 20 to 150 seconds. Examples of curing stations include but are not limited to microwave curing stations, hot baths employing, for example, inorganic salts and/or glass beads, and electrical ovens.

Prior to heat-laminating the heat-activatable adhesive layer bearing the primer layer to the extruded shaped rubber article in position 20, 22, or 24 (FIG. 1), the heat-activatable layer is preferably stretched to an extent essentially corresponding to the shrinkage of the shaped rubber article due to curing and/or cooling. The temperature of the shaped rubber article at the place of bonding the heat-activatable adhesive bearing the primer layer to it, is above the softening point of the heat activated adhesive material and is at least 100° C. because insufficient bonding is obtained at lower temperatures. The bonding temperature preferably is at least 125° C., more preferably at least 140° C., and especially preferably between about 150° C. and about 175° C. The bonding temperature can also be 200° C. or more. The bonding temperature does preferably not exceed 250° C., and more preferably does not exceed 230° C. The heat-activatable adhesive layer is pressed with the surface opposite to that bearing the primer layer, against the surface of the hot shaped rubber article with sufficient pressure to effect a bond between the heat activated adhesive and the shaped rubber article. Typically, this is a pressure of between about 1–250 N/cm$^2$ and preferably of at least 10 N/cm$^2$, and more preferably, at least about 12 N/cm$^2$. It was found that a bonding temperature of at least 120° C. is preferred in order to obtain a strong and reliable bonding between the shaped rubber article and the heat-activatable adhesive layer. Especially preferred is a bonding temperature of at least 140° C. The bonding is usually performed by passing the shaped rubber article and the heat-activatable adhesive layer with the primer layer through rolls.

The cooling station is optional because the substrate according to the present invention comprising the shaped rubber article, the heat-activatable adhesive layer, and the primer layer can also simply be exposed to ambient temperature after bonding. Cooling the substrate according to the invention in a water bath or air stream is preferred.

Subsequently, a pressure-sensitive adhesive layer is attached to the primer layer of the substrate. The resulting article comprising the substrate and an adhesive layer bonded to it, is termed above and below as composite rubber profile.

Figure 2:
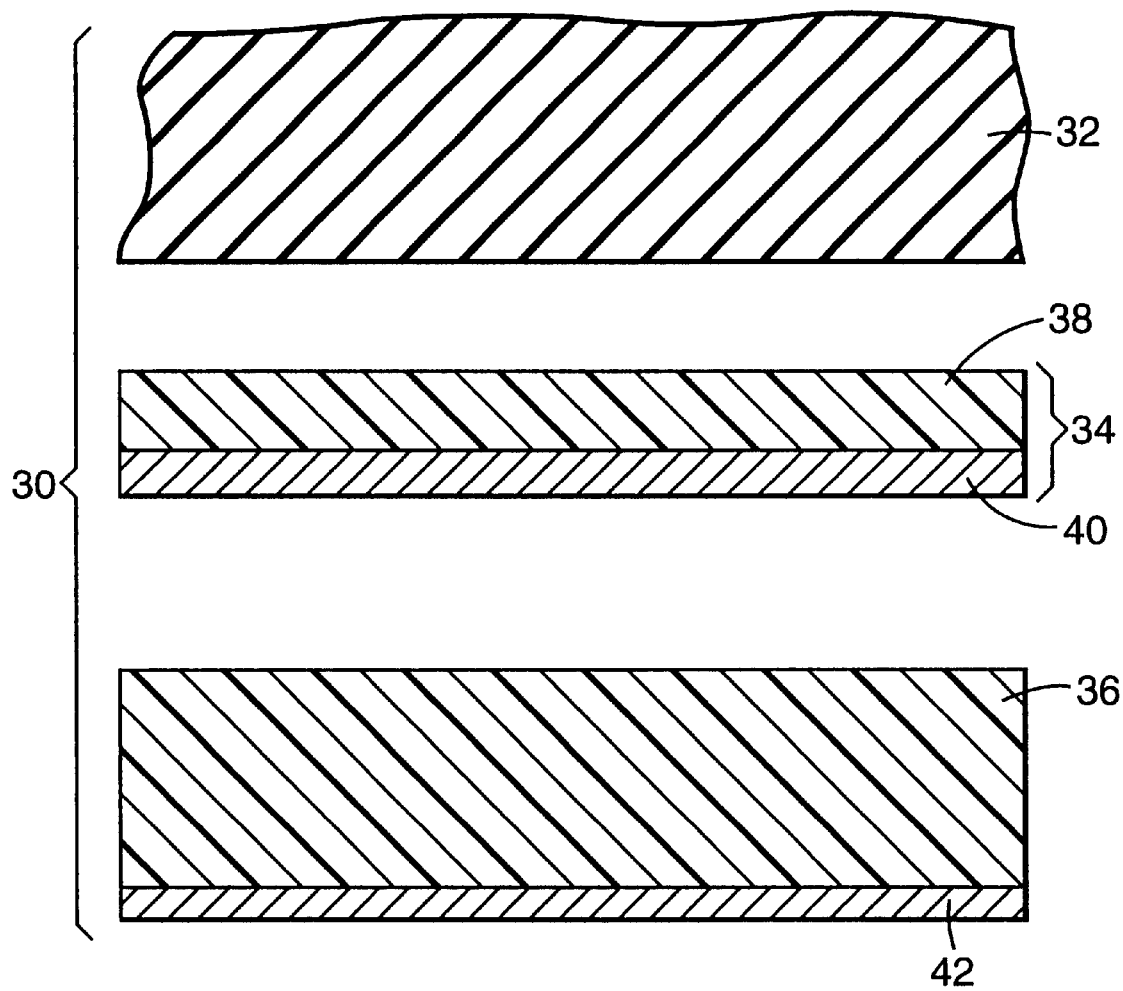
FIG. 2 shows an exploded view of one embodiment of the substrate of the invention.

As shown in FIG. 2, a composite rubber profile 30 comprises an elastomeric or rubber article 32, a heat-activatable adhesive component 34, and a pressure-sensitive adhesive layer 36. The heat-activatable adhesive component 34 comprises a heat-activatable adhesive material 38 having a primer layer 40 on a surface of the heat-activatable adhesive material that is opposite to the rubber article 32. A releasable liner 42 is used to protect the unbonded surface of the pressure-sensitive adhesive layer 36 before use.

The pressure-sensitive adhesive layer 36 with one or two releasable liners 42 may be supplied and used in the form of a roll prior to the pressure-sensitive adhesive layer being laminated to the primer layer.

In a first embodiment, the pressure-sensitive adhesive layer is an unsupported, that is, carrier- or backing-free adhesive film which is preferably laminated to the primer layer as a transfer film. The unsupported adhesive film may comprise a single layer of a pressure-sensitive adhesive or a pressure-sensitive adhesive foam, respectively, or it may also comprise a multiple layer structure such as, for example, the two-layer sequence pressure-sensitive adhesive foam/ pressure-sensitive adhesive, or the three-layer sequence pressure-sensitive adhesive/pressure-sensitive adhesive foam/pressure-sensitive adhesive. Both the single layer or multiple layer structures are termed as pressure-sensitive adhesive layers or unsupported pressure-sensitive adhesive films, respectively. Two layer or multiple layer structures of the pressure-sensitive adhesive layer are advantageous in that the adhesion properties of the two adhesive layers can be optimized with respect to the primer layer and the surface to which the outward adhesive layer is to be attached to, respectively. Above and below, the term pressure-sensitive adhesive foam denotes adhesive materials having open or closed cells. In foam adhesive materials, up to 65% of the volume of the pressure-sensitive adhesive material comprises voids created by frothing (mixing with gas) or incorporation of hollow microspheres (polymeric or glass microbubbles, for example). Pressure-sensitive adhesive foams are described, for example, in U.S. Pat. Nos. 4,223,067 and 4,415,615; and EP 0 257 984. The term pressure-sensitive adhesive is used for materials which do not exhibit a foam structure. Pressure-sensitive adhesive foam layers typically are relatively thick (typically at least 500 μm) while non-foam pressure-sensitive adhesive layers typically are less than 500 μm and preferably less than 250 μm thick. Unsupported pressure-sensitive adhesive films comprising a pressure-sensitive adhesive foam layer are especially preferred.

In another embodiment, the pressure-sensitive adhesive layer or film, respectively, forms part of a double-sided adhesive tape comprising a carrier layer or backing bearing on its two opposite surfaces two exposed pressure-sensitive adhesive layers.

Composite rubber profiles comprising a substrate according to the invention and an unsupported pressure-sensitive adhesive film or a double-sided adhesive tape having in each case a pressure-sensitive adhesive foam layer which is preferably bonded to the primer layer of the substrate, usually better conform to shaped or curved surfaces they are applied to such as, for example, car bodies, and the stress at the bonding line between the surface and the outward (exposed) adhesive layer of the composite rubber profile is often reduced.

The unsupported adhesive film and the outward adhesive layer of the double-sided pressure-sensitive adhesive tape preferably comprises one or more acrylate-based pressure-sensitive adhesive materials which are described, for example, in U.S. Pat. Nos. Re 24,406; 4,181,752; 4,303,485; 4,329,384; and 4,330,590, all incorporated herein by reference, or in Handbook of Pressure Sensitive Adhesive Technology, ed. by D. Satas, New York 1989, pp. 396–456, or other pressure-sensitive adhesive materials like, for example, rubber resin adhesives or block copolymer adhesives. The use of acrylate-based pressure-sensitive adhesive materials is preferred. Pressure-sensitive adhesive layers exhibiting a multiple layer structure, can be obtained, for example, by lamination of single layers. The person skilled in the art can easily select pressure-sensitive adhesive materials from the pool of pressure-sensitive adhesive materials described in literature. Pressure-sensitive adhesive materials which are preferably attached to the primer layer of the substrate according to the present invention, are described, for example, in EP 0 384 598, p. 4, line 27–p. 5, line. 47. The other adhesive layer of the double-sided pressure-sensitive adhesive tape can have the same or another composition as the outward adhesive layer.

The unsupported adhesive film preferably has a thickness of 50–2,000 μm and preferably between 400–1,100 μm. The outward layer of a double-sided adhesive tape preferably has a thickness of 50–500 μm. Depending on the respective application, the carrier layer or backing may be selected from a group of materials comprising polymeric films of various stiffness such as, for example, polyolefins, polyesters, polycarbonates or poly(meth)acrylates, various polymeric non-pressure-sensitive adhesive foams such as poly(meth)acrylate based polymeric foams, papers, nonwovens, laminates or metals. The thickness of the carrier layer typically varies between 25–3,000 μm, preferably between 25–2,000 μm.

The pressure-sensitive adhesive layer, that is, the unsupported adhesive film or the supported double-sided tape, can be passed through rolls in order to effect bonding. The bonding is usually performed at room temperature, the bonding pressure is typically 5–80 N/cm². In some case it is sufficient to apply the adhesive layer by fingertip pressure although this is not a preferred procedure.

The outward surface of the pressure-sensitive adhesive layer is typically protected by a liner which is removed prior to attaching the composite rubber profile of the invention to another surface via the pressure-sensitive adhesive layer.

The composite rubber profile can be applied to a wide variety of surfaces and the adhesion properties of the outward adhesive layer of a supported double-sided film can be specifically adapted and optimized with respect to a certain surface as was described above.

The present invention was found to be especially useful for the application of gaskets and weatherstrip seals to automobiles, refrigerators, or door frames.

The following examples serve to illustrate the invention without limiting it in scope. Prior to this, some test methods utilized in the examples, will be described.

T-peel adhesion

The substrate of the present invention comprising a shaped rubber article, a heat-activatable adhesive layer, and a primer layer was cut into 12 cm sections.

Then a pressure-sensitive adhesive tape comprising an unsupported layer of tape available from Minnesota Mining and Manufacturing Company as 5367 Acrylic Foam Tape was applied to the primer layer of the substrate by room temperature pressure lamination using 2 passes of a 6.8 kg roller moving at 300 mm/min.

The outward side of the pressure-sensitive adhesive layer was then reinforced by first removing the liner and then adhering a 127 μm layer of aluminum foil to the exposed adhesive surface.

The article thus formed was allowed to age for 24 hours at room temperature, 1 week at room temperature or 1 week at 70° C., respectively, followed by one hour conditioning at room temperature before the T-peel test measurements were made.

The T-peel adhesion was measured at a peel rate of 100 mm/min using a tensile tester as described in test method DIN 51221. Three measurements were made on each sample and the results were averaged. Results were recorded in N/cm. Two distinct failure methods were noted:

FP Adhesives failure of the bond between the acrylate-based pressure-sensitive adhesive layer and the primer layer FS Cohesive failure of the pressure-sensitive adhesive layer which indicates that the bond between the pressure-sensitive adhesive layer and the primer layer was greater than the strength of the pressure-sensitive adhesive layer.

EXAMPLES

Example 1

A primer layer was applied to a layer of a heat-activatable adhesive comprising a 65 μm thick sheet of ethylene acrylic acid (EAA) copolymer (available from The Dow Chemical Company as Primacor™ 3330 Dow) by coating it with a solution of a commercially available polyamide (from Henkel KGaA as Macromelt™ 6240) dissolved in a 30/70 parts by weight mixture of toluene and isopropanol in a concentration of 20 wt. %. The solvent was evaporated leaving a thin coating with a thickness of approximately 5 μm.

An ethylene-propylene-diene (EDPM) rubber composition (obtained from Laboratoire de Recherches et de Controle du Caoutchouc et des plastices, Vitry sur Seine Cedex, France as 90 Shore A hardness rubber) which is designated below and above as Rubber A, and has the following composition:

| Component | Parts by Weight |
|---|---|
| EPDM Vistalon 7000 | 100 |
| Carbon Black FEF N550 | 115 |
| CaCO$_3$ | 30 |
| Naphthenic Oil (Flexon 876) | 25 |
| ZnO | 10 |
| Stearic Acid | 2 |
| Sulphur | 4 |
| N-cyclohexyl-2-benzothiazylsulfonamide | 2.2 |
| Tetramethylthiuram Disulfide | 0.75 |
| Dipentamethylthiuram Tetrasulfide | 0.75 |
| 4,4'-dithiomorpholine, Sulfasan R | 0.75 | was fed into a double-screw extruder which is designed to extrude shaped rubber articles used as door and window gaskets in the automotive industry.

A schematic representation of the setup used for the preparation of substrates according to the invention is shown in FIG. 1 and comprises the double-screw extruder 12, a microwave curing station 14 (power of 2 kW), an oven curing station 15 (hot air oven, comprising 3 sections) and a cooling station 16 (water cooling).

The extrusion conditions were chosen as follows:

| extruder 12 temperature | |
|---|---|
| inlet | 60° C. |
| first screw | 70° C. |
| second screw | 75° C. |
| die (3) temperature | 80° C. |
| screw speed | 40 min$^{-1}$ |
| extrusion speed | 7 m/min |

The primed heat-activatable adhesive was laminated. with sufficient pressure to effect a bond, to the warm shaped rubber article at position 22 (FIG. 1) between the microwave curing station 14 (oven temperature of 200° C.) and the oven curing station 15 (oven temperature 200° C.–240° C.). The temperature of the shaped rubber article at position 22 (FIG. 1) was 137° C. The primed heat-activatable adhesive layer was laminated to the shaped rubber article in a manner such that the primer layer was left exposed, that is, facing away from the shaped rubber article, thus proving a suitable surface for subsequent bonding of a pressure-sensitive adhesive layer.

Example 2

Example 1 was repeated with the exceptions that each of the extruder temperatures was chosen to be about 20° C. lower, that is

| extruder 12 temperatures | |
|---|---|
| inlet | 40° C. |
| first screw | 50° C. |
| second screw | 55° C. | that the temperature of the shaped rubber article at position 22 (FIG. 1) was 154° C., and that the following ethylene-propylene-diene (EPDM) rubber composition (obtained from Laboratoire de Recherches et de Controle du Caoutchouc et des plastices, Vitry sur Seine Cedex, France as 60 Shore A hardness rubber) which is designated below and above as Rubber B, was used.

| Component | Parts by Weight |
|---|---|
| EPDM Vistalon 7000 | 100 |
| Carbon Black FEF N550 | 100 |
| CaCO3 | 30 |
| Naphtenic Oil (Flexon 876) | 90 |
| ZnO | 4 |
| Stearic Acid | 1 |
| Sulphur | 2 |
| 2-mercaptobenzothiazole | 1.5 |
| Tetramethylthiuram Disulfide | 0.8 |
| Tellur or Zinc Diethyldithiocarbamate | 0.8 |

Example 3

Example 1 was repeated with the exceptions that the lamination was performed at position 20 (FIG. 1) at a temperature of the shaped rubber article of 128° C. and that the primed heat-activatable adhesive layer was prepared as follows:

The heat activated adhesive was a 0.064 mm thick ethylene-propylene polyallomer obtained under the product designation M-906 from Scholler Technical Papers. The polyallomer was supplied on a paper release liner and was corona treated.

A premix composition was prepared by mixing 2 parts of N,N-dimethylacrylamide, with 0.01 part of surfactant (FC-430 available from Minnesota Mining and Manufacturing Company, and 0.01 part of a yellow fluorescent dye (Keystone Yellow FPGN) in a jar and shaking to disperse. Then 6.65 parts of N,N-dimethylacrylamide and 1.33 parts of trimethylolpropanetriacrylate were added to the premix and mixed to form a primer composition.

The primer was coated onto the corona treated surface of the heat activated adhesive to a thickness of about 15 micrometers. The coated surface was then exposed to electron beam radiation at a dose of about 5 Mrads, a voltage of about 175 Kv in a nitrogen atmosphere to produce a heat-activated adhesive film. The substrate obtained showed some bubbling of the heat-activatable adhesive layer after the curing process was complete, that is, after leaving cooling station 16 (FIG. 1).

The results of the T-peel tests are summarized in Table 1.

Example 4

Example 3 was repeated with the exception that the heat-activatable adhesive layer bearing a primer layer was laminated to the shaped rubber articles at position 22 (FIG. 1) at a temperature of 137° C. The results of the T-peel adhesion tests are summarized in Table 1.

Example 5

Example 3 was repeated with the exception that the heat-activatable adhesive layer bearing a primer layer was laminated to the shaped rubber articles at position 24 (FIG. 1) at a temperature of 144° C. The results of the T-peel adhesion tests are summarized in Table 1.

Example 6

Example 4 was repeated with the exception that the surface of the primer layer was cleaned with ethanol before application of the pressure-sensitive adhesive layer. The results of the T-peel adhesion tests are summarized in Table 1.

Example 7

Example 3 was repeated with the exception that the rubber fed into extruder 12 (FIG. 1), comprised Rubber B as described in Example 2. Unlike Example 3, the temperature of the shaped rubber article at position 20 (FIG. 1) was 106° C.

The substrate obtained showed some bubbling of the heat-activatable adhesive layer after the curing process was complete, that is, after having passed cooling station 16 (FIG. 1).

The results of the T-peel tests are summarized in Table 1.

Example 8

Example 4 was repeated with the exception that the rubber fed into extruder 12 (FIG. 1) comprised Rubber B. The temperature of the shaped rubber article at position 22 (FIG. 1) was 154° C. The results of the T-peel adhesion tests are summarized in Table 1.

Example 9

Example 5 was repeated with the exception that the rubber fed into extruder 12 comprised Rubber B. The temperature of the shaped rubber article at position 24 (FIG. 1) was 168° C. The results of the T-peel adhesion tests are summarized in Table 1.

Example 10

Example 8 was repeated with the exception that the exposed surface of the primer layer was cleaned with ethanol before application of the pressure-sensitive adhesive tape. The results of the T-peel adhesion tests are summarized in Table 1.

Comparative Example 1

A heat-activatable adhesive layer was prepared and primed as in Example 3, and then an acrylic foam tape with a polyethylene release liner was laminated to the heat-activatable adhesive layer. The multi-layer tape was then laminated to a shaped rubber profile comprising Rubber A at position 22 (FIG. 1) and at a temperature of 137° C., following the procedure described in Example 1. The release liner component was unable to withstand temperatures of 200° C.–240° C. in the oven curing station 15, resulting in an unusable end-product.

Comparative Example 2

Comparative Example 1 was repeated, with the exception that the multilayer tape was laminated to the shaped rubber substrate comprising Rubber A, at position 24 (FIG. 1) and at a temperature of 144° C. The resulting construction showed very low and unacceptable T-peel adhesion between the shaped rubber article and the heat-activated adhesive later. The heat-activated adhesive-foam tape laminate could be removed easily by hand with an estimated T-peel adhesion value of less than 1 N/cm.

TABLE 1

| Example | Elastomer (type) | Temp. at lam. point (° C.) | Position (20, 22, 25 - FIG.1) | T-peel (24 hrs, RT) N/cm | T-peel (1 wk, RT) N/cm | T-peel (1 wk 70° C., 1 hr RT) N/cm |
|---|---|---|---|---|---|---|
| 1 | A | 137 | 22 | — | — | — |
| 2 | B | 154 | 22 | — | — | — |
| 3 | A | 128 | 20 | 15 FP | 21 FP | 39 FS |
| 4 | A | 137 | 22 | 23 FP | 31 FP/FS | 38 FS |
| 5 | A | 144 | 24 | 15 FP | 22 FP | 39 FS |
| 6 | A | 137 | 22 | 36 FS | 32 FS | 42 FS |
| 7 | B | 106 | 20 | 9 FP | 15 FP | 33 FS |
| 8 | B | 154 | 22 | 12 FP | 16 FP | 32 FS |
| 9 | B | 168 | 24 | 10 FP | 14 FP | 31 FS |
| 10 | B | 154 | 22 | 29 FS | 30 FS | 34 FS |
| Comp. 1 | A | 137 | 22 | damaged by heat | — | — |
| Comp. 2 | A | 144 | 24 | <1 | — | — |

FP Adhesive failure of the bond between the acrylic pressure-sensitive adhesive and the primer layer.
FS Cohesive failure of the pressure-sensitive adhesive layer (indicates that the bond between the pressure-sensitive adhesive and the printer was greater than the cohesive strength of the adhesive layer.)

We claim:

1. A process for bonding a pressure-sensitive adhesive, a shaped rubber article without wrinkling the pressure-sensitive adhesive, the process comprising:
   (a) providing a shaped rubber article;
   (b) providing a heat-activatable adhesive layer bearing a primer layer;
   (c) providing a pressure-sensitive adhesive layer;
   (d) heat-laminating the heat-activatable adhesive to the rubber article at a temperature of at least 100° C. and with sufficient pressure to effect a bond between the heat-activatable adhesive and the rubber article; and
   (e) laminating the pressure-sensitive adhesive layer to the primer layer.

2. A process according to claim 1 wherein the shaped rubber article is provided in an at least partially crosslinked state.

3. The process of claim 1 further comprising the step of passing said shaped rubber article through a curing station before the step of heat-laminating the heat-activatable adhesive to the rubber article.

4. The process of claim 1 further comprising the step of passing said shaped rubber article through first and second curing stations before the step of heat-laminating the heat-activatable adhesive to the rubber article.

5. The process of claim 4 wherein said first curing station is a microwave curing station and said second station is an oven curing station.

6. The process of claim 1 wherein the heat-activatable adhesive is heat-laminated to the rubber article at a temperature of between about 125° C. and about 250° C.

7. The process of claim 1 wherein the heat-activatable adhesive is heat-laminated to the rubber article at a temperature of between about 140° C. and about 250° C.

8. The process of claim 1 wherein the heat-activatable adhesive is heat-laminated to the rubber article at a temperature of between about 150° C. and about 175° C.

9. A kit for bonding a rubber article to a surface, said kit comprising:
   (a) a heat-laminated article comprising a rubber article and a heat-activatable adhesive layer bearing a primer layer, with said heat-activatable adhesive layer being heat-laminated to said article; and
   (b) a pressure-sensitive adhesive layer, separate from said heat-laminated article, having opposite major surfaces with a releasable liner on one major surface, an opposing major surface suitable for adhesively bonding to said primer layer of said heat-laminated article.

10. A method of using the kit of claim 9 for bonding said rubber article to part of an automobile, refrigerator, or door frame by adhering the pressure-sensitive adhesive layer to the part after said pressure sensitive adhesive is laminated to the primer layer.

* * * * *